United States Patent

Eschwey et al.

[11] Patent Number: 5,147,724
[45] Date of Patent: Sep. 15, 1992

[54] METHOD FOR PRODUCING SMOOTH SURFACES ON PLASTICS

[75] Inventors: ManfredNeumann Eschwey, Düsseldorf; Rolf van Bonn, Duisburg; Horst Neumann, Kelkheim, all of Fed. Rep. of Germany

[73] Assignee: MG Industries, Valley Forge, Pa.

[21] Appl. No.: 772,786

[22] Filed: Oct. 8, 1991

Related U.S. Application Data

[63] Continuation of Ser. No. 578,394, Sep. 7, 1990, Pat. No. 5,073,231.

[51] Int. Cl.$^5$ ............................................. B32B 27/00
[52] U.S. Cl. ..................................... 428/409; 428/500
[58] Field of Search ................ 428/500, 409; 156/646

[56] References Cited

U.S. PATENT DOCUMENTS

| | | | |
|---|---|---|---|
| 3,737,499 | 6/1973 | Kamena | 264/341 X |
| 4,247,580 | 1/1981 | Chao | 427/140 |
| 4,376,751 | 3/1983 | Duchane | 264/341 |
| 4,478,781 | 10/1984 | Zaelke | 264/341 |
| 4,529,563 | 7/1985 | McGinniss | 264/83 |

*Primary Examiner*—Edith L. Buffalow
*Attorney, Agent, or Firm*—William H. Eilberg

[57] ABSTRACT

Plastic objects are exposed to a gas mixture containing fluorine and a gaseous oxidizing agent, to produce an extremely smooth surface on the objects. The oxidizing agent can be oxygen, and the object is preferably exposed to the gaseous mixture for about 10-30 seconds. The surface of the object treated according to the present invention is found to be considerably more smooth and glossy than objects treated with fluorine alone, without the oxidizing agent. The surface formed according to the present invention therefore minimizes the contact area between the treated object and the surrounding media.

6 Claims, 2 Drawing Sheets

METHOD FOR PRODUCING SMOOTH SURFACES ON PLASTICS

This is a continuation of application Ser. No. 07/578,394, filed Sept. 7, 1990.

BACKGROUND OF THE INVENTION

This invention concerns a process for generating smooth surfaces on objects made of polymers of ethylene, propylene, butadiene, and polystyrene.

The surface which results from the process of the present invention plays an important role in almost all sectors of plastics processing. Sliding and frictional resistance, permeation characteristics, wettability, and gloss, to name only a few of the properties of the polymer surfaces, are critically influenced by the morphology of the surface. A surface that is as smooth as possible, even on a microscopic scale, minimizes all interactions between the surface and media which are in contact with it. For example, the rates of permeation and swelling processes are greatly influenced by the available active surface of the polymer (see "Formation of barrier layers in hollow plastic objects", [Sperrschichtbildung bei Kunststoffhohlkörpern], published by Verein Dt. Ingenieure, VDI Verlag, ISBN 3-18-234-121-9, pp. 20-21). In addition to these advantageous properties of a smooth surface as compared with the matte surfaces such as those exhibited at present by objects made of, for example, HDPE, a smooth glossy surface also has a decorative effect in many sectors. High-gloss surfaces are usually a prerequisite for good marketability of semi-finished products (such as films) and finished parts (such as household articles).

The present invention provides a process for generating smooth surfaces on objects made of polymers of ethylene, propylene, butadiene, and polystyrene, which as a result of the minimization of the active surface produced thereby, exhibit extremely low interactions with media that are in contact with them.

SUMMARY OF THE INVENTION

According to the invention, a plastic object is exposed to a gas mixture which includes fluorine and a gaseous oxidizing agent. The oxidizing agent can be oxygen. The object can be made of a polymer such as ethylene, propylene, butadiene, polystyrene, or other polymers. In one embodiment of the invention, the gas mixture can contain about 0.01–0.5% fluorine, by volume, and 0.5–21% oxygen, by volume. The object is exposed to the gas mixture for a short time, of the order of about 10–30 seconds.

It is therefore an object of the invention to produce an extremely smooth surface on an article of plastic.

It is another object to reduce the frictional resistance exhibited by the surfaces of plastic articles.

It is another object to provide a method of making a plastic article which is relatively impermeable to solvents.

It is another object to provide a method of increasing the glossiness of a plastic article.

It is another object to minimize the interaction between the surface of a plastic article, and the media in contact with that surface.

Other objects and advantages of the invention will be apparent to those skilled in the art, from a reading of the following brief description of the figures, the detailed description of the invention, and the appended claims.

DETAILED DESCRIPTION OF THE INVENTION

Figure 1:
FIG. 1 is a reproduction of a scanning electron microscope image of specimen II of the Example described below, with a magnification of 2,000 ×, showing that the specimen has a smooth surface.
Figure 2:
FIG. 2 is similar to FIG. 1, except that the magnification is 10,000 ×.

The essence of the process of the present invention is to provide simultaneous action, on a polymer surface, of gaseous fluorine and a gaseous oxidizing agent. Therefore, the process comprises the step of exposing a plastic object to a gas mixture which includes fluorine and a gaseous oxidizing agent. The object can be made of a polymer such as ethylene, propylene, butadiene, or polystyrene, or other polymers containing hydrocarbon compounds, but is not necessarily limited to the use of these polymers. The preferred gaseous oxidizing agent is oxygen, but oxygen-releasing gases, such as $N_2O$, are also suitable. The fluorinated barrier coatings produced in this manner are differentiated from coatings generated in an oxygen-free manner by the properties discussed below.

Scanning electron microscope images of the surfaces reveal a uniform, smooth structure, even at 10,000 times magnification, in contrast with images of objects treated according to conventional methods.

The surfaces produced according to the invention are high-gloss compared with untreated surfaces or oxygen-free fluorinated surfaces.

Surfaces produced according to the invention possess a good barrier action against non-polar solvents. Because of the favorable surface structure, very low fluorine packing densities (a maximum of approximately 6 $\mu g/cm^2$) are sufficient to achieve this barrier effect. Surfaces treated exclusively with fluorine require a packing density several times higher than this.

The inventors attribute these surprising results to an etching abrasion by oxygen which occurs simultaneously with fluorination. During the highly exothermic reaction between fluorine and the hydrocarbon compounds of the polymer, large quantities of heat are released, leading to melting in regions close to the surface. As the material re-solidifies by cooling, the differences in coefficient of expansion between the fluorinated barrier coating and the base polymer lead to folding and warping. The presence of oxygen prevents this, however. The surface areas with high energy, namely peaks and ridges, are preferentially removed by the oxidative etching action of the oxygen. This was confirmed by IR spectroscopic quantification of the volatile reaction products $CO_2$ and HF which form in this reaction.

The percentage of fluorine in the gas mixture required for the process according to the invention (between 0.01 and 0.5%, by volume) is very small compared with the amount of fluorine used for pure fluorination processes. The temperature range preferred for the process according to the invention is between 130° and 160° C. when the object is made of HDPE, and allows particularly light melting of the polymer surface. It is in any case above the crystal melting point of the particular polymer. The crystal melting point is the melting point of the crystals which form from the long molecular chains of the polymer upon cooling. In HDPE, the proportion of crystals is between 40% and 80% depending on the polymerization process; the remainder consists of amorphous fractions.

The required contact times, between the object and the gaseous mixture, are short, and are generally between 10 and 30 seconds. Preferred processing pressures are between 0.1 and 11 bars, although considerably higher pressures (for example, 20 bars) can also be used. The surface roughness values that can be achieved with the process according to the invention lie between 0.4 and 0.6 $\mu$m. For comparison, untreated or fluorinated surfaces exhibit roughness values that are several times greater.

The effectiveness of the process according to the present invention will be evident from the following example.

EXAMPLE

Bottles made of HDPE (HOECHST AG black Hostalen (R) 7746, with a density between 0.944 and 0.948 Gg/cm$^3$) with a volume of 500 ml were exposed on the inside and outside, in an autoclave at 10 bars and at a uniform polymer surface temperature of approximately 135° C., to various mixtures of nitrogen, fluorine, and oxygen according to the invention.

Contact times in all cases were 20 seconds. The test results obtained are summarized in the table below.

| Specimen No. | F$_2$ volume, % | O$_2$ volume, % | Surface finish; Roughness Measurement [ill.] | Fluorine packing density (g/cm$^2$) two measurements each |
|---|---|---|---|---|
| I/1 | 0.2 | 1.3 | Glossy | |
| I/2 | 0.2 | 1.3 | Glossy, 0.58 $\mu$m | 5/5 |
| I/3 | 0.2 | 1.3 | Glossy | |
| I/4 | 0.2 | 1.3 | Glossy | |
| II/1 | 0.4 | 2.6 | Glossy | |
| II/2 | 0.4 | 2.6 | Glossy, 0.58 $\mu$m | 6/6 |
| II/3 | 0.4 | 2.6 | Glossy | |
| II/4 | 0.4 | 2.6 | Glossy | |
| III/1 | 0.4 | 0.0 | Matte | |
| III/2 | 0.4 | 0.0 | Matte, 1.25 $\mu$m | 16/17 |
| III/3 | 0.4 | 0.0 | Matte | |
| III/4 | 0.4 | 0.0 | Matte | |
| IV/1 | 1.27 | 0.0 | Matte, 1.7 $\mu$m | 35/38 |
| IV/2 | | | Matte | |

Permeation experiments with 500 cm$^3$ bottles made of black HOSTALEN (R) GM 7746

The untreated specimens had a matte surface with surface roughness values between 1.7 and 3.5 $\mu$m.

Despite the low fluorine packing density, the surfaces produced in accordance with the invention have a barrier effect against polar solvents that is better by a factor of 2 to 5, as compared with that of fluorinated surfaces produced under anaerobic conditions.

To confirm the latter conclusion, the bottles were treated only on their inner surfaces according to the invention, under otherwise identical conditions. Haltermann ERFG 30 lead-free test gasoline at a test temperature of +40° C. was used to test permeation losses. While the bottles treated according to the invention, as illustrated by specimens I and II, exhibited permeation losses of much less than 1% by weight, even after six weeks, the conventionally treated bottles (specimen III) exhibited losses of several percentage points, by weight, in some cases over 10%. Even the bottles treated with a high dose of fluorine (specimen IV) showed permeation losses of almost 2% by weight.

Figure 3:
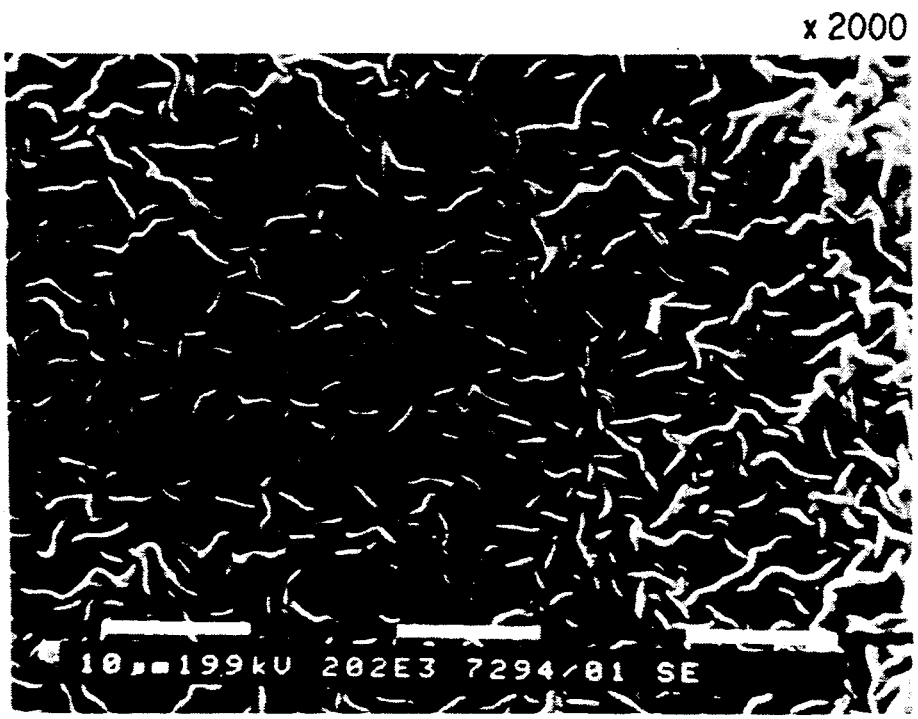
FIG. 3 is a reproduction of a scanning electron microscope image of specimen III of the Example, with a magnification of 2,000 ×, showing that the specimen has a matte surface.
Figure 4:
FIG. 4 is similar to FIG. 3, except that the magnification is 10,000 ×.

FIGS. 1 to 4 show scanning electron microscope images of the specimen surfaces. FIG. 1 shows a 2,000 × magnification and FIG. 2 a 10,000 × magnification of the surface of specimen II treated in accordance with the present invention. On the other hand, FIGS. 3 and 4 show 2,000 × and 10,000 × magnifications, respectively, of the surface of anaerobically fluorinated specimen III. While the surface treated according to the invention shows a uniform smooth surface, the conventionally treated surface shows considerable warping, with a corresponding increase in the active surface of the polymer.

The present invention should not be deemed limited by the specific examples discussed above. Modifications of the invention are possible, and should be considered within the spirit and scope of the following claims.

What is claimed is:

1. A plastic object having a smooth surface the object is made of a polymer selected from the group consisting of ethylene, propylene, butadiene polystyrene and hydrocarbon compounds the object being produced by a process of selecting the object and exposing the object to a gas mixture containing fluorine and a gaseous oxidizing agent.

2. The object of claim 1 wherein the oxidizing agent is oxygen.

3. The object of claim 1, wherein the gas mixture contains about 0.01–0.5% fluorine, by volume, and 0.5–21% oxygen, by volume.

4. The object of claim 1, wherein the object is exposed to the gas mixture at temperatures above the crystal melting point of the polymer.

5. The object of claim 1 wherein the object is exposed to the gas mixture for a period of about 10–30 seconds.

6. An object made of HDPE, produced according to the process comprising the step of exposing the object to a gas mixture containing fluorine and a gaseous oxidizing agent, wherein the process is performed at temperatures above the crystal melting point of the HDPE, wherein the process is performed at temperatures between about 130° and 160° C., and wherein the object has a surface roughness of between about 0.4 and 0.6 $\mu$m.

* * * * *